US012744716B2

(12) United States Patent
Curic et al.

(10) Patent No.: US 12,744,716 B2
(45) Date of Patent: Sep. 22, 2026

(54) DYNAMIC IMPLEMENTATION OF REACTIVE ACTIONS IN EDGE NODES BASED ON USER INTENTS

(71) Applicant: International Business Machines Corporation, Armonk, NY (US)

(72) Inventors: Maja Curic, Munich (DE); Sagar Tayal, Ambala (IN); Alecio Pedro Delazari Binotto, Munich (DE); Fernando Luiz Koch, Palm Beach Gardens, FL (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 18/784,197

(22) Filed: Jul. 25, 2024

(65) Prior Publication Data

US 2026/0032068 A1 Jan. 29, 2026

(51) Int. Cl.
*H04L 43/08* (2022.01)
*H04L 41/16* (2022.01)

(52) U.S. Cl.
CPC .............. *H04L 43/08* (2013.01); *H04L 41/16* (2013.01)

(58) Field of Classification Search
CPC ................................ H04L 43/08; H04L 41/16
See application file for complete search history.

(56) References Cited

U.S. PATENT DOCUMENTS

| | | | | |
|---|---|---|---|---|
| 10,819,629 | B2 | 10/2020 | Dowlatkhah et al. | |
| 10,957,311 | B2 | 3/2021 | Solomon et al. | |
| 11,259,979 | B2 | 3/2022 | Swift et al. | |
| 2023/0362056 | A1 | 11/2023 | Lucas et al. | |
| 2024/0031390 | A1 | 1/2024 | Singh et al. | |
| 2024/0251258 | A1 * | 7/2024 | Monteiro | H04W 36/32 |
| 2024/0430279 | A1 * | 12/2024 | Huang | G06N 3/047 |
| 2025/0261272 | A1 * | 8/2025 | Teyeb | H04W 16/22 |

FOREIGN PATENT DOCUMENTS

| | | | |
|---|---|---|---|
| CN | 110417896 | B | 1/2022 |
| CN | 113422801 | B | 12/2022 |
| CN | 110603021 | B | 12/2023 |

* cited by examiner

*Primary Examiner* — Viet D Vu
(74) *Attorney, Agent, or Firm* — CHIP LAW GROUP

(57) ABSTRACT

Mechanisms are provided for dynamically implementing reactive actions in edge nodes of a network in response to user equipment (UE) behaviors. Data of UE events are collected to infer UE movements and UE behavior within the network. A machine learning computer model is executed on the collected data of UE events to predict UE movements and UE behavior and their impact on edge node conditions within the network with regard to quality of service (QoS) metrics. An accuracy of the precited impacts of the predicted UE movements and UE behavior is evaluated and, based on the accuracy, reactive action(s) to execute to reduce the predicted impact of inaccurate predictions on edge node conditions with regard to the QoS metrics are determined and recommended to a control plane of the network for implementation of at least one of the one or more reactive actions on edge node(s) of the network.

18 Claims, 4 Drawing Sheets

DYNAMIC IMPLEMENTATION OF REACTIVE ACTIONS IN EDGE NODES BASED ON USER INTENTS

BACKGROUND

The present application relates generally to an improved data processing apparatus and method and more specifically to an improved computing tool and improved computing tool operations/functionality for determining dynamic edge adaptations based on user intents and supportive artificial intelligence.

Modern services are ultra-low latency and as such, have stringent requirements to maintain such ultra-low latency service guarantees. In order to fulfill these requirements, data and services are moved to the far edges of the data networks, i.e., closer to the end users and their devices that will make use of the data and services. By moving the data and services closer to the user devices, the latency of communications within the network are minimized. However, even with such edge hosting of data and services, there are still issues that arise, especially in the case of networks that service mobile computing devices.

For example, in mobile networks, such as cellular or satellite based networks, where user equipment (UE), e.g., mobile smartphones, vehicle mounted computing devices, and the like, move throughout the mobile network, much overhead is dedicated to handling the way in which computational loads of UEs are managed as the UE moves from one area serviced by one end node, to another area serviced by another end node. In such mobile networks, as UEs move in the mobile network, they establish connections with various edge nodes, e.g., base stations in a mobile network, through which they communicate data with other computing devices as well as gain access to various computing resources. This requires that as the connection of the UE transitions from one end node to another, the computational loads of the UE also be transitioned. This may cause dynamic unbalanced and inefficient allocation of resources within the network and a degradation of the service quality provided by the network to the UEs.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for dynamically implementing reactive actions in edge nodes of a data communication network in response to user equipment (UE) behaviors. The method comprises collecting data of UE events in the data communication network to infer UE movements and UE behavior within the network. The method further comprises executing a machine learning computer model on the collected data of UE events to predict UE movements and UE behavior and their impact on edge node conditions within the data communication network with regard to quality of service (QoS) metrics. In addition, the method comprises evaluating an accuracy of the precited impacts of the predicted UE movements and UE behavior. Based on the accuracy, the method comprises determining one or more reactive actions to execute to reduce the predicted impact of inaccurate predictions on edge node conditions with regard to the QoS metrics. Furthermore, the method comprises sending a recommendation of the one or more reactive actions to a control plane of the data communication network for implementation of at least one of the one or more reactive actions on one or more of the edge nodes of the data communication network.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
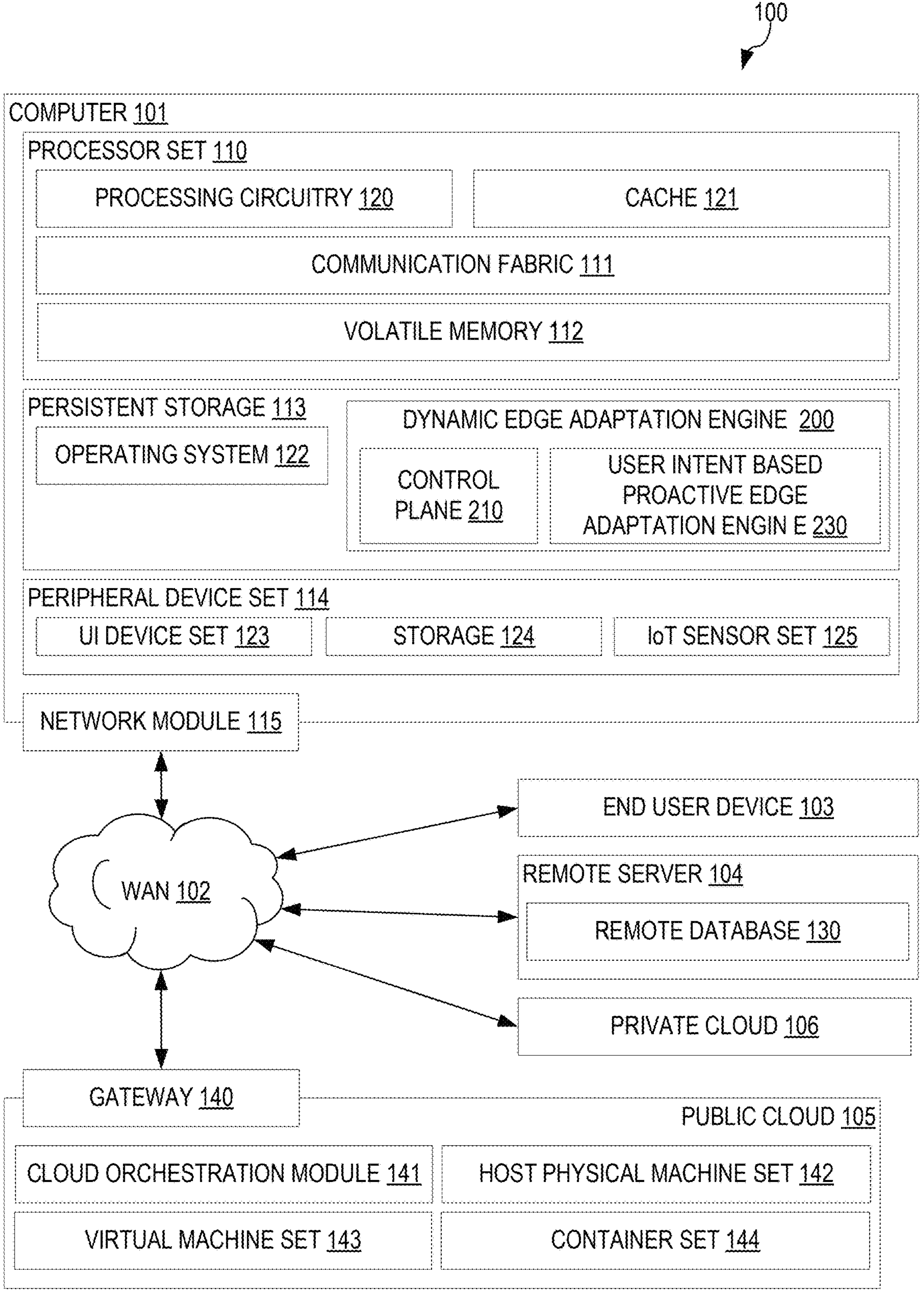
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for determining dynamic edge adaptations based on user intents and supportive artificial intelligence. The illustrative embodiments address the issues of inaccurate predictions by artificial intelligence (AI) computer models, e.g., generative AI computer models, with regard to network edge condition developments that affect quality of user experience. The solutions provided by the illustrative embodiments include the implementation of reactive measures as an imperative to address issues promptly and uphold a high-quality user experience while optimizing operational costs. The illustrative embodiments involve extended information collection, for example, of user equipment (UE) intents, from a selected group or groups of UEs. This extended information collection minimizes false predictions in situations where reactive operations cannot fully or quickly enough mitigate the effects of false predictions or failed proactive operations.

As noted above, in modern mobile networks, where a mobile network is a data communication network in which UEs are free to move and may dynamically connect with various end nodes of the network as they move from one area or region of the network to another, UEs often have to transition from one end node to another to maintain connectivity to the mobile network, where an edge node is a computing system at the edge of the data communication network and with which the UE directly communicates, such as via wired or wireless data communication links. In response to UE movement in the mobile network, the edge configuration of the edge nodes is adapted to ensure optimal resource utilization and quality of service by all UEs connected to these edge nodes. This may include redeployment of relevant user applications to edge data centers (DCs) closer to the user's current UE location, UE handover to edge nodes with better Quality of Service (QoS) metrics for specific services required by the UE workloads, and the like.

In pursuit of timely responses to changes in the network, so as to adapt the edge configuration, networks may employ generative artificial intelligence (AI) computer models to drive proactive operations by predicting future edge conditions and UE behavior and requirements based on the previously collected edge and UE data. For example, consider a scenario where users move across a geographic region while running one or more processes that demand low-latency computation. As they move, their UEs establish connections with various ones of the edge nodes to maintain connectivity. For example, a user might be streaming a live event while commuting, switching from one base station to another along the route in order to maintain connectivity and not interrupt the streaming. Alternatively, the user may be involved in real-time gaming or video conferencing, each of which also require low-latency computations.

Each connection change triggers the need for seamless transition of computational tasks to the new edge node to ensure uninterrupted service delivery. This dynamic movement and computation demand prompts adjustments to edge configurations for optimal resource allocation and service quality. While generative AI models may be used to predict the future edge conditions, generative AI models do not consistently yield accurate predictions for proactive operations, leading to disruptions in the quality of user experiences. When proactive operations fail, and service quality has been impacted by the failure, reactive measures become imperative to address issues promptly and uphold a high-quality user experience while optimizing operational costs.

In addition, it is important to note that false predictions and failed proactive operations will not affect all UEs in the network equally. For instance, when false predictions and failed proactive operations occur, reactive measures need to prioritize reactive measures addressing issues for UEs with high-priority SLAs first. Furthermore, reactive measures may not always be able to fully mitigate the impact of false predictions/failed proactive operations. Here again, the focus should be on minimizing false predictions for UEs with high-priority SLAs altogether. As described hereafter, the illustrative embodiments collect an extended set of information from such UEs, called user intents, which is not collected by existing data communication networks, that will reduce the likelihood of false predictions leading to failed proactive operations.

The illustrative embodiments address the issue of inaccurate predictions by artificial intelligence (AI), machine learning (ML), generative AI, etc. computer models which operate to predict future conditions of a network to facilitate performing resource allocation and management operations for a mobile network. In particular, the illustrative embodiments provide mechanisms for performing user intention (intents) based edge adaptation which includes predicting the impact of user behavior on edge nodes and implementing reactive measures when such user behavior deviates from AI model predictions, i.e., when it becomes imperative to address issues promptly to uphold a high-quality user experience while optimizing operational costs. The user intention-based edge adaptation of the illustrative embodiments includes a recommendation system that is tailored specifically for edge configuration adaptation recommendations, making use of insights derived from the analysis of user behavior and recommending actions to dynamically adjust edge configurations to optimize resource allocation and improve user experiences.

The illustrative embodiments are able to proactively anticipate user movements and behavior within the mobile network and dynamically adjust edge configurations in response to such movements and in response to predicted movements. The illustrative embodiments include advanced machine learning and large AI computer models, e.g., foundational and/or generative AI computer models, combined with rule-based engines to process real-time data from network telemetry, user interactions, and edge requirements in low-latency dependent applications to continually refine the recommendation system's accuracy and adaptability.

In accordance with one or more illustrative embodiments, the user intention-based edge adaptation system comprises a continuous data collection engine and a user behavior impact engine comprising one or more AI computer models and/or one or more rule based inference engines that operate to predict the impact of user behavior on edge nodes. The continuous data collection engine continuously collects data of UE events from which to infer movements and behavior within the mobile network. The collected data of UE events is analyzed by the computer models and rule-based engines to infer mappings of alterations of user behavior with applicable forecasted impacts on edge nodes. For instance, if many users are expected to converge on a particular edge node due to an event or activity, the user intention-based edge adaptation system is aware of the resource distribution and future task allocations on these edge nodes, so that the user behavior impact engine can forecast increased UE demand over time, should the predicted user behavior be sustained.

The user intention-based edge adaptation system further comprises a prediction quality engine that performs continuous assessment of prediction quality on edge nodes which involves evaluating the accuracy of predictions regarding user behavior and its impact on edge nodes in the mobile network. The processes of the prediction quality engine involve the execution of one or more AI, ML, generative AI, or large AI computer models and/or rule-based inference engines, to identify incorrect predictions based on the predicted and existing impact on edge nodes, focusing on identifying user equipment (UEs) affected by these incorrect predictions. These UEs are grouped into profiles based on attributes, such as services in use, devices utilized, session duration, and the like. Deviations in user (or UE) behavior are quantified by comparing predicted user (or UE) behavior with actual observations from the collected UE event data. The computer models and/or rule-based inference engines analyze the probable causes of the identified deviations and infers adjustments to both the prediction computer model and edge configurations.

The user intention-based edge adaptation system also comprises a reactive measures engine to recommend reactive measures to counter inaccurate user (or UE) behavior predictions. The operation of the reactive measures engine involves continuously assessing operational costs on edge nodes incurred due to inaccurate user (or UE) behavior predictions and their impact on service quality. The reactive measures engine may include one or more AI, ML, generative AI, or large AI computer models and/or rule-based inference engines to identify specific UEs not affected by the inaccuracies by evaluating the quality of service affected by incorrect predictions and assessing whether reactive measures improved QoS as per service level agreements (SLAs). The reactive measures engine then evaluates the costs in inaccurate predictions on UE groups defined as noted above. The one or more computer models and/or rule-based inference engine operate to infer actionable recommendations for optimizing resource allocation, enhancing edge configurations, and mitigating disruptions, as well as assess the costs of incorrect predictions for each UE group.

The reactive measures engine is able to assess the outcome of the reactive measures and identify if these succeeded in rectifying issues caused with false predictions or not for the UE group(s). This information will be provided to the continuous data collection engine.

The continuous data collection engine initiates extended data collection (collection of the real-time user intent directly from the UE which is otherwise not collected in existing data communication (mobile) networks, for specific groups of UEs where inaccurate predictions are unacceptable since reactive measures did not solve the issue and SLA was impaired. Collecting this extended information will not be done by default for all UEs, and is only done when determined necessary, i.e., where inaccurate predictions are determined to impact UEs at an unacceptable level, and for UEs for which it is necessary, optimizing both resource utilization and system performance. Hence, the continuous data collection engine of the intention-based edge adaptation system dynamically collects the optimal/minimal amount of information for each UE group.

The following description provides examples of embodiments of the present disclosure, and variations and substitutions may be made in other embodiments. Several examples will now be provided to further clarify various Aspects of the Present Disclosure.

Example 1: A computer-implemented method for dynamically implementing reactive actions in edge nodes of a data communication network in response to user equipment (UE) behaviors. The method comprises collecting data of UE events in the data communication network to infer UE movements and UE behavior within the network, and executing a machine learning computer model on the collected data of UE events to predict UE movements and UE behavior and their impact on edge node conditions within the data communication network with regard to quality of service (QoS) metrics. The method further comprises evaluating an accuracy of the predicted impacts of the predicted UE movements and UE behavior. Based on the accuracy, the method comprises executing one or more computer executable rules of a rules based engine, to determine one or more reactive actions to execute to reduce the predicted impact of inaccurate predictions on edge node conditions with regard to the QoS metrics. In addition, the method comprises sending a recommendation of the one or more reactive actions to a control plane of the data communication network for implementation of at least one of the one or more reactive actions on one or more of the edge nodes of the data communication network. The above limitations advantageously enable not only the prediction of performance of edge nodes in a data communication network with regard to UEs, but also evaluates the accuracy of these predictions and the impact of inaccurate predictions on these edge nodes and UEs. In this way, reactive actions may be determined and implemented to reduce the negative affects of inaccurate predictions on end node performance and UE experiences.

Example 2: The limitations of any of Examples 1 and 3-10, where evaluating the accuracy of the predicted impacts of the predicted UE movements and UE behavior comprises identifying incorrect predicted impacts based on actual impacts experienced by the data communication network and one or more UEs affected by the incorrect predicted impacts. The above limitations advantageously enable the identification of incorrect prediction impacts based on prior impacts occurring in the data communication network based on similar predictions. Thus, the invention is able to learn from historical data how incorrect predictions will impact the performance of edge nodes and the UE experiences.

Example 3: The limitations of any of Examples 1-2 and 4-10, where evaluating the accuracy of the predicted impacts comprises identifying a severity of the impacts based on data communication network conditions and priority levels of the one or more UEs affected by the incorrect predicted impacts. The above limitations advantageously enable the reactive actions to prioritize areas of the network where the impacts are predicted to be severe and where high-priority UEs may be affected by inaccurate predictions.

Example 4: The limitations of any of Examples 1-3 and 5-10, where evaluating the accuracy of the predicted impacts comprises grouping UEs into UE profiles based on attributes of the UEs, where UEs having similar attributes are grouped together in a UE profile, where these attributes comprise at least one of first attributes specifying services in use by the UEs, second attributes specifying devices utilized by the UEs, or third attributes specifying session durations, and where the method further comprises predicting an impact of an inaccurate prediction on each of the UE profiles. The above limitations advantageously enable the prediction of inaccurate predictions on groups of UEs that are similar to one another so that it can be determined which UEs are more or less impacted by the inaccurate predictions and identify UEs that are not affected by inaccurate predictions.

Example 5: The limitations of any of Examples 1-4 and 6-10, where the collected data comprises updates to edge node configurations comprising hardware, software, and network configurations, updates to edge node performance metrics, and UE reports specifying device data of devices corresponding to the UEs. The above limitations advantageously enable the identification of impacts of these types of changes to edge nodes, network configurations, and changes in user or UE behaviors on a continuous basis so as to be able to dynamically react to these changes.

Example 6: The limitations of any of Examples 1-5 and 7-10, where executing a machine learning computer model on the collected data of UE events to predict UE movements and UE behavior and their impact on edge node conditions within the data communication network with regard to quality of service (QoS) metrics comprises extracting features from the updates to edge node configurations, updates to edge node performance metrics, and UE reports to generate input features for input to the machine learning computer model, and processing the input features to identify patterns of input features corresponding to predicted UE movements and UE behaviors and their impact on edge node conditions. The above limitations advantageously enable the leveraging of machine learning computer model insights in determining impacts of predicted UE movements and UE behaviors on edge node conditions of a data communication network.

Example 7: The limitations of any of Examples 1-6 and 8-10, where the method further comprises updating a training of the machine learning computer model based on results of the evaluating of the accuracy of the predicted impacts and the determined one or more reactive actions. The above limitations advantageously enable continued refinement of the machine learning of the machine learning computer model so as to make improved predictions as to the impacts of UE movements and UE behaviors on edge node conditions.

Example 8: The limitations of any of Examples 1-7 and 9-10, where the one or more reactive actions comprise at least one of resource reallocation between nodes of the data communication network, fine-tuning edge node configurations of edge nodes of the data communication network, or implementing a targeted redundancy for edge nodes in the data communication network. The above limitations advantageously enable various types of reactive actions for addressing the impacts of inaccurate predictions on edge node and network conditions.

Example 9: The limitations of any of Examples 1-8 and 10, where the method further comprises selecting, by the control plane, one or more management actions to be executed on one or more edge nodes of the data communication network based on the recommendation of the one or more reactive actions and one or more established policies for management actions, and executing the one or more management actions on the one or more edge nodes of the data communication network to modify a configuration of the one or more edge nodes. The above limitations advantageously enable the determination of management operations to perform with regard to the data communication network and/or edge nodes of the data communication network not only based on the reactive action recommendations, but also based on established policies so that appropriate management operations may be performed to improve performance of the data communication network.

Example 10: The limitations of any of Examples 1-9, where the UEs comprise one or more of a smartphone, laptop computer, vehicle mounted computing device, or mobile computing device, and wherein the data communication network is a wireless mobile network. The above limitations advantageously enable the implementation of the improved computing tool and improved computing tool operations/functionality with wireless data communication networks, such as cellular networks or the like, and with mobile computing devices, such as those listed above.

Example 11: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Example 12: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a dynamic edge adaptation system having a user intent based proactive edge adaptation engine. The improved computing tool implements mechanism and functionality, such as monitoring user equipment movements and behavior in a mobile network, predicting the impact of such movements and behaviors on edge nodes of the mobile network, assessing the prediction quality, and automatically performing reactive measures in response to prediction quality being below a predetermined threshold, which cannot be practically performed by human beings either outside of, or with the assistance of, a technical environment, such as a mental process or the like. The improved computing tool provides a practical application of the methodology at least in that the improved computing tool is able to continuously monitor and assess the impact of user equipment movements and behaviors, i.e., user intents, and predictions of user intents and their impact on edge nodes so as to facilitate resource allocations to maintain required levels of latency and service, and to perform reactive measures to maintain such levels in the event that the predictions are determined to be inaccurate.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as a dynamic edge adaptation engine 200 having a user intent based proactive edge adaptation engine 230. In addition to a dynamic edge adaptation engine 200 having a user intent based proactive edge adaptation engine 230, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and a dynamic edge adaptation engine 200 as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in a dynamic edge adaptation engine 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in a dynamic edge adaptation engine 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a dynamic edge adaptation system 200 having a user intent based proactive edge adaptation engine 230. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates proactive edge adaptations in mobile networks and reactive measures when predictions of user equipment movements prove to be inaccurate.

Figure 2:
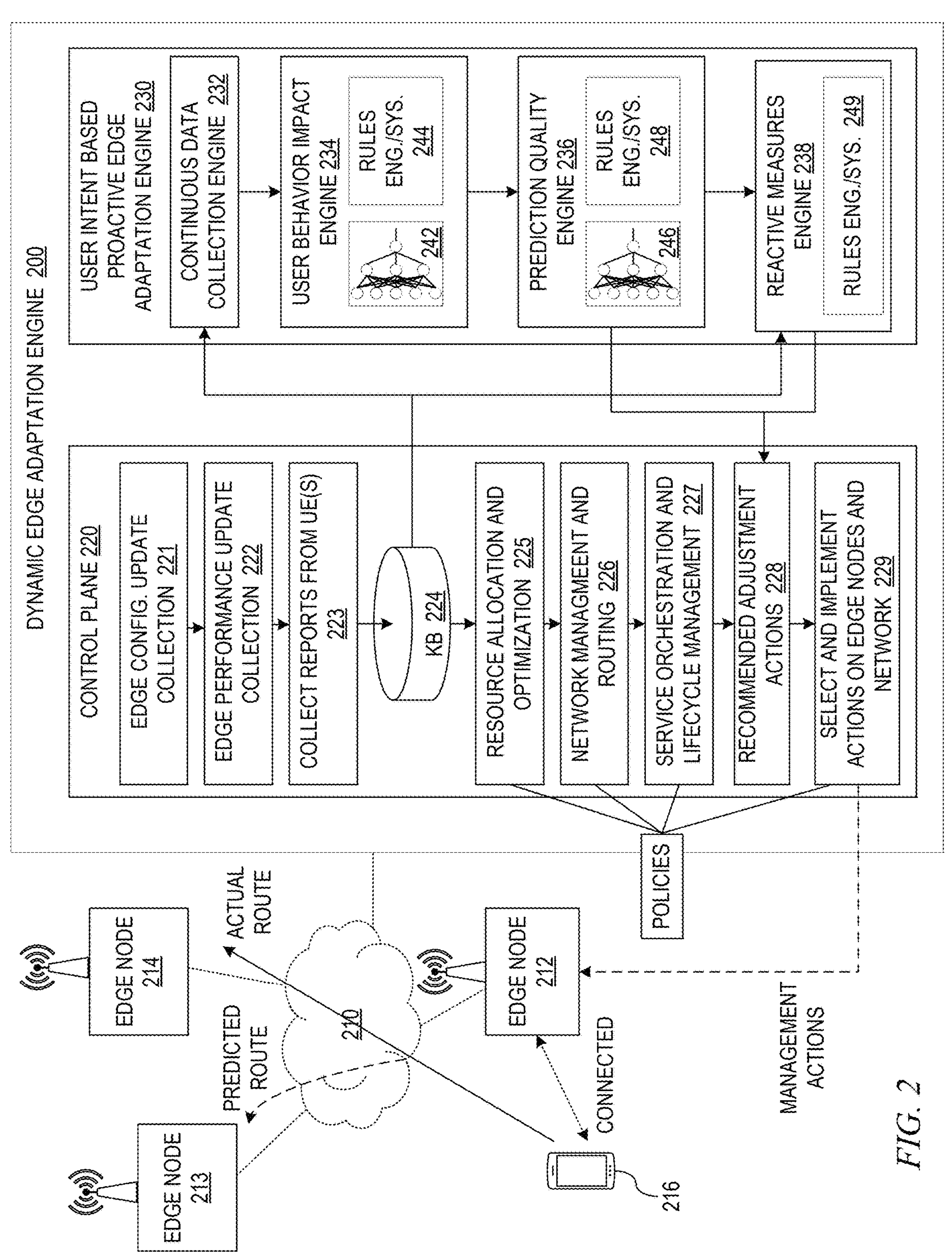
FIG. 2 is an example block diagram illustrating the primary operational components of a dynamic edge adaptation system for a mobile network in accordance with one illustrative embodiment.

FIG. 2 is an example block diagram illustrating the primary operational components of a dynamic edge adaptation system for a mobile network in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings and the resulting output may aid human beings. The invention is specifically directed to the automatically operating computer components directed to improving the way that proactive edge adaptations are implemented in a mobile network, and more specifically to the way in which such adaptations are performed in view of inaccurate predictions so as to perform reactive measures, which cannot be practically performed by human beings as a mental process and is not directed to organizing any human activity.

As shown in FIG. 2, a mobile network 210 comprises a plurality of edge nodes 212-214 for various regions of the mobile network 210 with which a user equipment (UE) device may connect as it moves throughout the mobile network 210. The end nodes 212-214 serve as points of connection for user equipment (UE) devices, such as UE device 216, which may be any type of mobile computing device, including laptop computers, smartphones, vehicle mounted computing devices, or the like. The edge nodes 212-214 have computing resources for handling computation loads from UE devices. The UE devices, such as UE device 216 move across regions of the mobile network 210 and thus, will connect and reconnect to different edge nodes 212-214 as the UE device 216 moves. The UE device 216 may be executing processes and performing activities that require low-latency computations, such as real-time gaming, video conferencing, and the like, as the UE device 216 moves. This movement between regions triggers changes in the connections to edge nodes 212-214 which requires transitions of computation tasks to maintain uninterrupted service delivery.

The mobile network 210 comprises one or more computing devices, such as servers or the like, which may be coupled to the edge nodes 212-214 and which host a control plane 220 for management and orchestration of the edge nodes 212-214 of the mobile network 210. The control plane 220 comprises computing logic and resources which implement a set of processes for resource management and load orchestration across the edge nodes 212-214. These processes include edge configuration update collection 221 which operate to monitor and process updates regarding the configuration of edge nodes 212-214, including changes in hardware settings, software configurations, and network parameters, where such changes are made in response to edge node usage, or predicted usage, by UE devices, so as to facilitate low-latency computations and meet service requirements. For example, when a change to a configuration of an edge node 212 occurs, the configuration update is reported to the control plane 220 which collects this update via process 221.

The control plane 220 further implements process 222 for collecting edge performance updates from the edge nodes 212-214. The process 222 continuously monitors edge node 212-214 performance metrics, such as Central Processing Unit (CPU) utilization, memory usage, network latency, and the like, which are metrics used for optimizing resource allocation to the edge nodes 212-214 and ensuring high-quality service delivery. In addition, process 223 operates to collect reports from UEs, such as UE device 216, such as via the end nodes 212-214, where these reports provide data regarding the UE devices that can be used to understand the behavior and adapt edge computing resources.

The information collected by the processes 221-223 is stored in an edge node and UE information knowledge base 224. This information may include edge node capabilities, capacities, geographic locations, and the like. This information may also include data about each of the UEs, such as user profiles, device types, communication preferences, and the like.

The control plane 220 further implements a resource allocation and optimization process 225 that dynamically allocates computing, storage, and networking resources across the edge nodes 212-214 based on workload demands and performance objectives. This dynamic allocation may be performed in accordance with established policies for resource management. Similarly, the control plane 220 implements a network management and routing process 226 which oversees the configuration and routing of network traffic within the edge node infrastructure of the mobile network 210 based on policies for network management. The control plane 220 also implements a service orchestration and lifecycle management process 227 which operates to orchestrate the deployment, scaling, and lifecycle management of edge services based on policies for load orchestration.

It should be appreciated that the above processes 221-227 of the control plan2 220 may be performed in accordance with any suitable known mobile network control plane of a mobile network infrastructure. In accordance with the illustrative embodiments, however, the control plane 220 is further augmented with logic that integrates with the user intent based proactive edge adaptation engine 230, which provides recommendations for adapting the edge nodes and the edge node infrastructure through the adjustments or adaptations of resource allocations to the edge nodes 212-214 based on operations of the user intent based proactive edge adaptation engine 230. The adjustments/adaptations specify optimization opportunities and adjustment actions to improve system performance or mitigate potential issues by analyzing data collected from the edge nodes and UEs. That is, as shown in FIG. 2, the information stored in the edge node and UE information knowledge base 224 may be provided to the user intent based proactive edge adaptation engine 230, such as on a continuous or periodic basis, which then processes the information to generate recommended adjustments/adaptations for the edge node infrastructure of the mobile network 210.

These adjustments or adaptations, in response to receiving data communications 228 specifying such adjustments/adaptations from the user intent based proactive adaptation engine 230, may be implemented by the process 229 which comprises logic for selecting and implementing management actions on the edge nodes 212-214 and the mobile network 210 to implement the adjustments/adaptations in accordance with policies for management actions. For example, the process 229 may evaluate the recommended adjustments/adaptations against the predefined policies for management actions and may then select appropriate actions and implement them on one or more of the edge nodes 212-214 and the network infrastructure, ensuring that changes align with operational guidelines and regulatory constraints.

As shown in FIG. 2, in accordance with one or more illustrative embodiments, the information stored in the knowledge base 224 is provided to the user intent based proactive edge adaptation engine 230, which processes this information in the continuous data collection engine 232 and the reactive measures engine 238. That is, the user intent based proactive edge adaptation engine 230 comprises the continuous data collection engine 232, user behavior impact engine 234, prediction quality engine 236, and reactive measure engine 238. The continuous data collection engine 232 comprises logic to receive/fetch and/or pre-process information from the knowledge base 224, i.e., information regarding the updates to edge nodes, updates to edge node performance, and UE reports, and extract features from this information that are used as input to the user behavior impact engine 234.

The user behavior impact engine 234 comprises one or more AI computer models and/or one or more rule based inference engines that operate to predict the impact of user behavior, represented in patterns of features extracted from the information collected by the continuous data collection engine 232, on edge nodes 212-214 of the mobile network 210. That is, the continuous data collection engine 232 continuously collects data of UE events from the knowledge base 224, from which to infer movements and behavior within the mobile network 210. The collected data of UE events is analyzed by the AI computer models and rule-based engines of the user behavior impact engine 234 to infer mappings of alterations of user behavior with applicable forecasted impacts on edge nodes. These user behavior, or UE behavior, patterns may include not only movement patterns, but also application utilization patterns, device utilization patterns, network switching behavior, and the like, associated with a UE. It should be noted that the movement patterns with regard to user behavior or UE behavior refers to a combination of user location and physical movement. Application utilization patterns include duration of application usage and data traffic amount associated with applications executing on the UE. Device utilization patterns comprise any patterns of application or UE functionality usage, e.g., user using virtual reality (VR) glasses, user playing a mobile video game, user using a video streaming service, or the like. Network switching behavior comprises data characterizing intra-technology switching, e.g., going from a WIFI connection to a 5G connection, multi-subscriber identity module (SIMs), etc.

User (or UE) behaviors in mobile networks encompass actions like application usage patterns, data consumption trends, location-based habits, content preferences, and device interaction styles. Predicting these behaviors involves analyzing historical data, using machine learning models to forecast future actions based on past behaviors, and considering contextual factors like time, location, and user preferences. For example, predicting that a user consistently streams music during evening jogs or accesses social media during lunch breaks helps optimize network resources and improve user experience by anticipating and accommodating these patterns.

In some illustrative embodiments, the user behavior impact engine 234 predicts the impact of user behavior on edge nodes 212-214 by leveraging an adjusted large AI model and a rules-based system on the data collected by the continuous data collection engine 232 from the mobile network 210 infrastructure. The adjusted large AI model and rules-based system performs predictions of edge node impacts, e.g., changes in resource demands and performance of edge nodes, followed by the classification of such user behaviors and movements of UEs. The large AI model is adjusted through machine learning training to predict user movements and behaviors based on historical data, considering factors such as user mobility patterns, application usage, network conditions, and edge node performance metrics.

In some illustrative embodiments, to effectively manage the impact of user behavior on edge nodes in a mobile network, a hybrid approach combining machine learning models and rules-based engines may be used. Machine learning models, such as the adjusted large AI model mentioned above, may operate to analyze historical data to discern patterns in user behavior such as peak usage times, application preferences, and geographical trends. For instance, the machine learning model(s) may identify that on weekday evenings there is a consistent increase in video streaming and social media usage in urban areas over time. Based on these insights, the machine learning model predicts future resource demands on edge nodes. If a significant surge in video streaming is anticipated during a specific time period, the model can recommend proactive resource allocation strategies, such as provisioning additional bandwidth or scaling up CPU resources for the affected edge nodes.

Simultaneously, in such illustrative embodiments, a rules-based engine may operate in real-time to enforce predefined policies and respond to immediate conditions. The rules-based engine, in these illustrative embodiments, is primarily used for reactive operations. For example, if CPU utilization on an edge node exceeds a certain threshold due to sudden spikes in demand, the rules-based engine can recognize this condition as a potential trigger for resource reallocation or other adjustments to maintain optimal performance. By integrating these approaches, user behavior impact engine 234 achieves a balanced response: machine learning model(s) provide predictive capabilities for proactive resource management while the rules-based engine ensures rapid adaptation to current network conditions.

Thus, the continuous data collection engine 232 performs real-time data collection to continuously collect real-time data form various sources within the mobile network 210 including UEs, edge nodes, network telemetry, and application requirements. The user behavior impact engine 234, in some illustrative embodiments, utilizes the adjusted large AI model 242, specifically trained to predict UE movements and edge node impacts, to predict the UE movements and user behaviors based on the real-time data collected. The predicted UE movements and user behaviors are input to the rules-based system 244 which uses one or more computer executable rules to classify relevant patterns and identify potential impacts on edge node operation conditions.

The computer executable rules of the rules-based system 244 utilizes thresholds in one or more of the computer executable rules to flag instances where predicted UE movements and user behaviors could potentially impact edge nodes. For example, a rule may specify that if the predicted number of simultaneous voice over internet protocol (VOIP) calls in a specific cell of the mobile network exceeds 80% of its maximum capacity during business hours, e.g., 9 am to 5 pm local time, then an alert is triggered to allocate additional CPU resources to the affected edge node. In this case, the threshold is set to 80% of the maximum historical concurrent VOIP calls observed during business hours over the past week. The alert is defined such that when the predicted number of simultaneous VOIP calls nears or exceeds 80% of the historical maximum capacity during business hours, an alert is generated. This alert prompts network administrators to allocate additional CPU resources to the relevant edge node immediately. For instance, the dynamic edge adaptation engine 200 may increase the processing power allocated to handle VOIP traffic, ensuring low latency and high call quality during peak usage periods.

In this scenario the rule focuses on optimizing CPU resource allocation based on predicted VOIP call volumes during specific hours. The threshold is defined based on past usage patterns to proactively manage performance and prevent congestion. The alert is defined such that it triggers an operational response to maintain service quality by dynamically adjusting resources in real-time.

The rules based system 244 may alert the prediction quality engine 236 and/or reactive measures engine 238 as to these thresholds being met or exceeded, or when specific patterns in the collected data indicate particular potential impacts on edge nodes, e.g., CPU usage increasing by 20% or the like, where 20% is a threshold. As noted previously, an example may be a situation where many users are going to converge on a particular edge node due to an event or activity, the user intent based proactive edge adaptation engine 230 is aware of the resource distribution and future task allocations on these edge nodes 212-214 from the collected information from the mobile network 210 infrastructure collected by the continuous data collection engine 232, so that the user behavior impact engine 234 can forecast increased UE demand over time, should the predicted user behavior be sustained.

The user intention-based edge adaptation system 230 further comprises a prediction quality engine 236 that performs continuous assessment of prediction quality on edge nodes which involves evaluating the accuracy of predictions regarding user behavior and its impact on edge nodes in the mobile network. It should be appreciated that the concept of impacts on edge nodes refers to changes in resource utilization (such as CPU, memory, bandwidth, and the like) and performance metrics (such as latency, packet loss, and the like) caused by user (or UE) behaviors. The impact is measured by monitoring increases or decreases in these resources and metrics in real-time, comparing them against baseline or historical data. Incorrect predictions are identified by comparing expected resource demands with actual observations using metrics such as Mean Absolute Error (MAE), Mean Squared Error (MSE), or other suitable observation metrics.

The processes of the prediction quality engine 234 involve the execution of one or more AI, ML, generative AI, or large AI computer models 246 and/or rule-based inference engines 248, to identify incorrect predictions based on the predicted and existing impact on edge nodes 212-214, focusing on identifying user equipment (UEs) affected by these incorrect predictions. For example, AI/ML model 246 may be an AI/ML computer model trained to infer anticipated impacts on edge nodes and the impact of adjustments to the edge nodes. The rules-based engines 248 may comprise rules to analyze the probable causes of prediction deviation.

For example, in some illustrative embodiments, the AI or ML models, rules-based engines, or the like, of the user behavior impact engine 234 may generate a predicted user impact on edge nodes which can then be compared to the actual impact on the edge nodes measured from the gathered information from the mobile network 210 infrastructure, e.g., the edge nodes 212-214, and the UEs. The comparison determines a difference, or error/loss, between the predicted and actual impacts. This error/loss is then used to adjust the operational parameters of the AI or ML models (e.g., weights of nodes of the AI or ML models) and/or rules-based engine (e.g., coefficients or weights associated with elements of the rules), such as by using a machine learning training algorithm, e.g., a regression algorithm, to determine modifications to the operational parameters. This may be done both during a training period for training these AI or ML models and/or rules based engines, and further during runtime operation via feedback information so as to perform continuous updating of these models/engines.

In some illustrative embodiments, the prediction quality engine 236 groups the affected UEs into profiles based on attributes, such as services in use, devices utilized, session duration, and the like. By categorizing and grouping UEs based on factors like their Service Level Agreements (SLAs), specific service usage patterns, etc. operations can strategically focus on refining prediction accuracy. For instance, UEs with critical SLAs, such as emergency services or high-priority enterprise clients, demand maximum reliability. Minimizing the occurrence of false predictions for these groups is essential to uphold seamless service and operational integrity. For such groups, during specific network conditions, it is necessary to collect more data from their devices than what is typically collected by the network. This approach aims to relieve system burden by automating triage between user (UE) groups, distinguishing those for whom false predictions should never cause issues and those for whom occasional inaccuracies are more manageable.

Deviations in user (or UE) behavior are quantified by comparing predicted user (or UE) behavior with actual observations from the collected UE event data. The computer models and/or rule-based inference engines analyze the probable causes of the identified deviations and infers adjustments to both the prediction computer model and edge configurations. In some illustrative embodiments, the rules-based inference engine may execute one or more computer executable rules on factors evaluated to generate the predictions, such as network congestion, device capabilities, application demands, and the like, so as to provide targeted adjustments to the AI or ML models. For example, if a sudden increase in video streaming causes network congestion, the prediction quality engine 236 analyzes data to detect anomalies, determines the root cause (such as higher-than-predicted bandwidth usage), and suggests adjusting parameters of the machine learning model implemented within the user behavior impact engine 234 to improve accuracy in predicting future high-demand scenarios. For example, the prediction quality engine 236 may suggest refining the algorithms responsible for bandwidth prediction to better anticipate high-demand scenarios.

Thus, in some illustrative embodiments, based on the collected data from the continuous data collection engine 232, and the predictions from the user behavior impact engine 234, the prediction quality engine 236 quantifies any deviation between the predictions and the observed UE movements and user behaviors. The UEs are grouped into profiles based on attributes, and the rules-based engines or system operate to analyze the probable causes of the prediction deviation based on a variety of factors, examples of which are network congestion, device capabilities, application demands, and the like. Based on the results of the rules-based engines/system analysis, adjustments to both the AI/ML models, i.e., prediction models, as determined by the prediction quality engine 236, and the edge node 212-214 configurations, as determined by the reactive measures engine 238, may be determined. The inferred adjustments may be delivered to the AI/ML models of the user behavior impact engine 234 and the edge nodes 212-214 in real-time to improve prediction accuracy and optimize edge node performance, which may include updating the AI/ML model 242 and/or rules engine 244 with new training data and/or operational parameters, and dynamically configuring edge node 212-214 parameters via the recommended adjustment actions 228 and the selection and implementation of management actions on the edge nodes and network 229.

As mentioned above, the user intent based proactive edge adaptation engine 230 also comprises a reactive measures engine 238 to recommend reactive measures to counter inaccurate user (or UE) behavior predictions. The operation of the reactive measures engine 238 involves continuously assessing operational costs on edge nodes incurred due to inaccurate user (or UE) behavior predictions and their impact on service quality. The reactive measures engine 238 may include rule-based inference engines 249 to identify specific UEs not affected by the inaccuracies by evaluating the quality of service affected by incorrect predictions and assessing whether reactive measures improved QoS as per service level agreements (SLAs). The reactive measures engine 238 then evaluates the costs in accurate predictions on UE groups defined as noted above. The rules-based inference engine 249 operates to infer actionable recommendations for optimizing resource allocation, enhancing edge configurations, and mitigating disruptions, as well as assess the costs of incorrect predictions for each UE group.

For example, in some illustrative embodiments, a set of computer executable rules may be configured to detect the conditions of the edge nodes 212-214 and promote actions to adjust prediction thresholds based on the observed impact of inaccurate predictions on operational costs and service quality metrics, ensuring timely and targeted intervention to counteract potential disruptions and uphold service level agreements (SLAs). In these illustrative embodiments, the reactive measures engine 238 may calculate operational costs incurred due to inaccurate predictions, considering factors such as resource consumption, network bandwidth, and service degradation.

It should be appreciated that these "costs" associated with false or inaccurate predictions in data communication (e.g., mobile) networks refers to both direct and indirect impacts on operations and resource management. For example, false or inaccurate predictions can lead to various types of additional costs including resource misallocation, reactive adjustments, and opportunity costs. With regard to resource misallocation, as an example, if a prediction inaccurately forecasts a surge in network traffic or application usage, operators may allocate resources (like bandwidth or processing power) in anticipation. If the actual demand does not materialize as predicted, these resources may remain underutilized, leading to inefficient resource allocation and potential wasted costs.

With regard to reactive adjustments, as an example, when false or inaccurate predictions result in mismatched resource allocations, operators must reactively adjust network configurations. For instance, if predicted high demand for a specific service does not occur, resources allocated for that service may need to be reallocated to meet actual demands elsewhere. This reactive work incurs costs in terms of operational overhead, time spent reconfiguring networks, and potential disruptions to service continuity.

With regard to opportunity costs, as an example, false or inaccurate predictions may also lead to missed opportunities where proactive actions were taken unnecessarily. For instance, if a prediction suggests a need for additional bandwidth provisioning due to anticipated peak usage that does not materialize, the resources allocated could have been utilized more effectively elsewhere. This missed opportunity represents a cost in terms of potential revenue or resource optimization.

As an example, consider a scenario where a prediction model of the user behavior impact engine 234 forecasts a significant increase in data traffic during a sports event based on historical trends. Operators allocate extra bandwidth to handle the anticipated load. However, due to unforeseen circumstances (e.g., weather affecting attendance or viewership patterns), the actual traffic remains below the predicted levels. The bandwidth allocated for this event remains underutilized, and resources could have been more effectively allocated elsewhere. The reactive adjustment involves reallocating bandwidth and adjusting configurations post-event, which incurs additional operational costs. Thus, false or inaccurate predictions in mobile networks can lead to inefficiencies in resource allocation, missed opportunities for proactive optimization, and reactive adjustments that incur operational costs. Improving prediction accuracy through enhanced data analysis and model refinement, such as provided by the prediction quality engine 236, is important to minimizing these costs and optimizing network performance effectively.

In addition, the reactive measures engine 238 applies a rules-based engine/system to identify specific UEs not affected by inaccuracies by evaluating their quality of service (QoS) metrics against the impact of incorrect predictions. Using Quality of Service (QoS) metrics, such as latency, packet loss, throughput, and the like, the reactive measures engine 238 evaluates how prediction inaccuracies impact individual UEs. For instance, if a machine learning model 242 predicts a surge in video streaming during peak hours, but the actual network data shows minimal increase in latency and no packet loss for a specific UE, e.g., UE 216, during that time, the system identifies this UE as less affected by the prediction error. This allows network operators to focus resource adjustments on UEs that exhibit significant QoS degradation, ensuring optimal service delivery and efficient resource utilization across the network.

Thus, for example, if resources of the edge nodes 212-214 are adjusted in accordance with the incorrect predictions, the configuration and performance of the edge nodes 212-214 may be modified, however this may not affect all the UEs connected to the mobile network 210, even for those edge nodes 212-214 whose configuration/performance is modified. Thus, if a UEs QoS metrics do not appreciably change, i.e., a change equal to or greater than a predetermined threshold value, after implementation of edge node configuration changes due to an incorrect prediction, then those UEs may be determined to be not affected by inaccuracies in the incorrect prediction.

In some illustrative embodiments, in order to determine which UEs are unaffected by incorrect predictions after adjusting edge node configurations, after making adjustments based on the incorrect predictions, such as reallocating resources, the edge configuration update collection process 221 collects changes in edge node configurations and the edge performance update collection process 222 collects edge node performance information. This information is provided to the continuous data collection engine 232 from which input features are provided to the user behavior impact engine 234 to determine the impact on edge node performance by the changes. For example QoS metrics may be monitored and evaluated, e.g., latency, throughput, etc. of the UEs. One or more predetermined thresholds of these QoS metrics may be set to gauge significant changes in QoS metrics post-adjustment, e.g., changes equal to or above, or equal to or below, the predetermined threshold. UEs showing minimal QoS changes, e.g., below the predetermined threshold, may be considered unaffected by the configuration adjustments due to incorrect predictions. UEs identified as unaffected remain stable despite the edge node changes, guiding operators to prioritize adjustments for UEs experiencing noticeable impacts. This ensures efficient resource management and maintains consistent service quality, focusing interventions where they are most needed.

In some illustrative embodiments, the reactive measures engine 238 may assess the impact of inaccurate predictions on QoS metrics by comparing them against predefined SLAs to determine the severity of disruptions. For example, in some illustrative embodiments, in order to determine and assess the impact of inaccurate predictions on QoS metrics as they relate to predefined Service Level Agreements SLAs and disruptions severity, the user intent based proactive edge adaptation engine 230 continuously monitors and determines QoS metrics, such as latency, packet loss, throughput, and the like for all UEs 216 in the network 210. These metrics provide real-time insights into the performance and service quality experienced by users. Each UE's QoS metrics are compared against predefined SLAs that specify acceptable levels of service quality. For example, an SLA might specify a maximum latency or minimum throughput requirement that must be maintained. Disruptions in QoS are assessed based on the deviation from these SLAs. Severity can be determined using predefined thresholds or criteria that define how much deviation constitutes a significant disruption. For instance, if latency exceeds the SLA threshold by a certain percentage, it could be classified as a severe disruption.

The prediction quality engine 236 may evaluate the impact of inaccurate predictions by analyzing how deviations from predicted behavior affect QoS metrics across the network 210. UEs experiencing significant deviations from their SLAs due to prediction inaccuracies indicate higher impacts and potentially severe disruptions. The identification of UEs that remain unaffected by configuration adjustments due to inaccurate predictions provides a baseline or reference point. These UEs help establish normal operational conditions and performance expectations. Disruptions in QoS metrics for other UEs can be compared against this baseline to gauge the relative severity of the impact.

Thus, the user intent based proactive edge adaptation engine 230 uses ongoing monitoring of QoS metrics, comparison with SLAs, and predefined criteria for disruptions to assess the impact of inaccurate predictions. The identification of unaffected UEs establishes a benchmark for normal operations, facilitating the evaluation of deviations caused by prediction inaccuracies and guiding targeted responses to mitigate disruptions effectively.

Based on the assessment of the impact of inaccurate predictions on QoS metrics and the determination of the severity of disruptions, reactive measures or actions, as determined by the reactive measures engine 238, may be implemented to improve QoS, such as adjusting resource allocation, enhancing edge configurations, or deploying redundancy measures. The particular reactive measures or actions to implement may be determined by a rules-based engine and/or machine learning computer models that determine the appropriate reactive measures considering the type and severity of the disruption, historical data, and real-time network conditions. For example, these reactive measures may take many different forms including adjusting resource allocation, deploying redundancy, and enhancing edge configurations.

With regard to the adjustment of resource allocations, these reactive measures may be implemented when there is high resource contention, e.g., CPU or bandwidth issues. The resource allocation adjustments may involve reallocating resources, such as increasing bandwidth or redistributing traffic to balance loads, so as to reduce the resource contention. For example, the resource reallocation may involve reallocating bandwidth from less critical nodes to edge nodes associated with high priority UEs experiencing high latency.

With regard to deploying redundancy, this reactive measure may be applied when there is a potential single point of failure or there are consistently overburdened nodes in the network 210. In such a case, the reactive measure may add backup servers, duplicate data paths, or employ failover mechanisms. For example, a secondary edge node may be deployed to share the load if an edge node frequently reaches capacity.

With regard to enhancing the edge configurations, this reactive measure may be employed when there is suboptimal performance or outdated configurations on the edge nodes. In such a case, the reactive measure may comprise updating software, optimizing routing algorithms, tuning performance settings, or upgrading hardware of the edge nodes to thereby modify their configurations. For example, if an edge node has suboptimal performance or is determined to have outdated configurations, then the software may be updated and the configuration optimized to improve that edge node's performance.

By evaluating QoS metrics against SLAs and using rule-based logic and machine learning insights, the reactive measures engine 238 applies the most effective reactive measures to maintain network performance and service quality. The reactive measures or actions may be evaluated to determine the effectiveness of the reactive measures or actions with regard to improvements in QoS as per the SLAs. This may be done by measuring the QoS metrics after implementation of the reactive measures or actions to determine if the QoS requirements of the SLAs are met or the QoS metrics are improved, i.e., closer to the QoS requirements, or not after implementation of the reactive measures or actions. If the reactive measures are not sufficient or only partially effective, the reactive measures engine 238 generates recommendations for further actions, triggering more detailed UE information gathering for a group of UEs, which is done by the continuous data collection engine 232 with the purpose of achieving better predictions.

Thus, the reactive measures engine 238 may apply a rules-based engine/system and/or machine learning model(s) to derive actionable recommendations for optimizing resource allocation, enhancing edge configurations, and mitigating disruptions based on observed prediction quality from the prediction quality engine 236. The reactive measures engine 238 receives detailed insights about QoS impacts and root causes of deviations from the prediction quality engine 236 and applies predefined rules to translate these insights into specific actions. For example, with regard to resource allocation, if a UE's battery statis is low and it is on a critical route, the recommendation may include prioritizing resource allocation to minimize power consumption while ensuring connectivity. If the ongoing route indicates future movement through high-congestion areas, the recommendation might involve pre-emptively optimizing edge node configurations along the route to ensure seamless service. If a specific application demand is causing issues, the reactive measures engine 238 might recommend deploying additional resources or redundancy measures to support that application's performance. By using detailed user intents and contextual information, the reactive measures engine 238 provides precise and effective recommendations to optimize resource allocation, enhance edge configurations, and mitigate disruptions, ensuring improved QoS and adherence to SLAs.

These actionable recommendations 228 are then sent to control plane 220 for implementation determinations, e.g., the selection and implementation of actions on the edge nodes and mobile network in process 229. The actionable recommendations 228 may then be evaluated relative to established policies to determine which management actions to implement in the network 210 and edge nodes 212-214 to improve the performance of the network 210. The policies may specify orders or priorities of actionable items to implement, e.g., one action may be preferred over another, may indicate prohibitions on actions to perform, a mapping to alternative management actions to perform rather than those recommended, or any other policy that a particular organization may wish to implement with regard to the network 210. Thus, while the reactive measure engine 238 may recommend certain actions to be performed based on an evaluation of the QoS and prediction quality, when compared to the established policies, these recommended actions may be mapped to management actions that may, or may not, be the actual recommended actions, may be alternative management actions, or may be management actions that achieve a similar result to that of the recommended actions.

Thus, the illustrative embodiments provide mechanisms, such as user intent based proactive edge adaptation engine 230, to continuously monitor the edge node infrastructure or a mobile network 210, predict UE movements and user behaviors, determine the impact of incorrect UE movement and user behavior predictions on QoS and SLAs associated with the mobile network 210, and determine reactive measures and actions to take to ensure QoS requirements within the mobile network 210. Thus, for example, if a prediction is that a UE will be moving withing a geographical region such that it will connect first to edge node 212 (base station), and then to edge node 213, but the actual movement is to edge node 214, then the mechanisms of the illustrative embodiments will determine the impact of such an incorrect prediction on the QoS and edge nodes 212-214 and provide recommendations of actions that can be taken to adjust the edge node configurations and resource allocations to maintain the required QoS for the UEs. As a result, an improved edge node infrastructure for a mobile network is achieved.

Thus, in accordance with one or more of the illustrative embodiments, specialized artificial intelligence (AI) computer models are trained and operate on features extracted from continuously collected real-time network, edge node, and user equipment (UE) data from mobile networks. These AI computer models are trained using a unique dataset that includes historical QoS metrics, user behavior patterns, and edge node performance data. This specialized training allows the models to accurately predict resource needs and potential disruptions based on specific network conditions.

In accordance with one or more of the illustrative embodiments, advanced machine learning (ML) computer models are provided that may use a combination of supervised and unsupervised learning techniques to continually refine their predictions. The advanced ML computer models analyze historical and real-time data to identify patterns and anomalies. For example, the advanced ML computer models can detect subtle shifts in network traffic that might indicate future congestion. The advanced ML computer models then adapt their algorithms to improve prediction accuracy, ensuring proactive management of network resources.

In accordance with one or more of the illustrative embodiments, context-aware rules-based engines are provided that incorporate context-specific rules that are tailored to the unique requirements of mobile networks. These rules consider factors such as the type of application being used, the priority level of the user (based on SLAs), and the current state of network resources. For instance, a rule might specify different actions for high-priority users experiencing latency issues compared to standard users, ensuring that critical services receive immediate attention.

In accordance with one or more of the illustrative embodiments, integrated decision making processes are provided that integrate the AI and ML computer model prediction results with rules-based engine execution of context-aware rules to create a cohesive decision-making process. When a potential issue is detected, the AI models predict the impact and suggest possible solutions. The rules-based engine then evaluates these suggestions against predefined rules and real-time conditions to select the most appropriate reactive measure(s). This integration ensures that decisions are not only data-driven but also contextually relevant.

For example, the AI model prediction may predict an impending bandwidth congestion based on increasing video streaming activity. The ML model analysis may then identify a pattern in historical data where similar increases led to congestion. The rules-based engine may then evaluate the situation, noting that high-priority users are among those streaming videos. A predefined rule prioritizes bandwidth allocation for these users. The user intent based proactive edge adaptation engine 230 may then reallocate resources in real-time to mitigate congestion for high-priority users, while recommendations are provided for long-term adjustments.

FIGS. 3-6 present flowcharts outlining example operations of elements of the present invention with regard to one or more illustrative embodiments. It should be appreciated that the operations outlined in FIGS. 3-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 3-6, and may, in some cases, make use of the results generated as a consequence of the operations set forth in FIGS. 3-6, the operations in FIGS. 3-6 themselves are specifically performed by the improved computing tool in an automated manner.

Figures 3, 4:
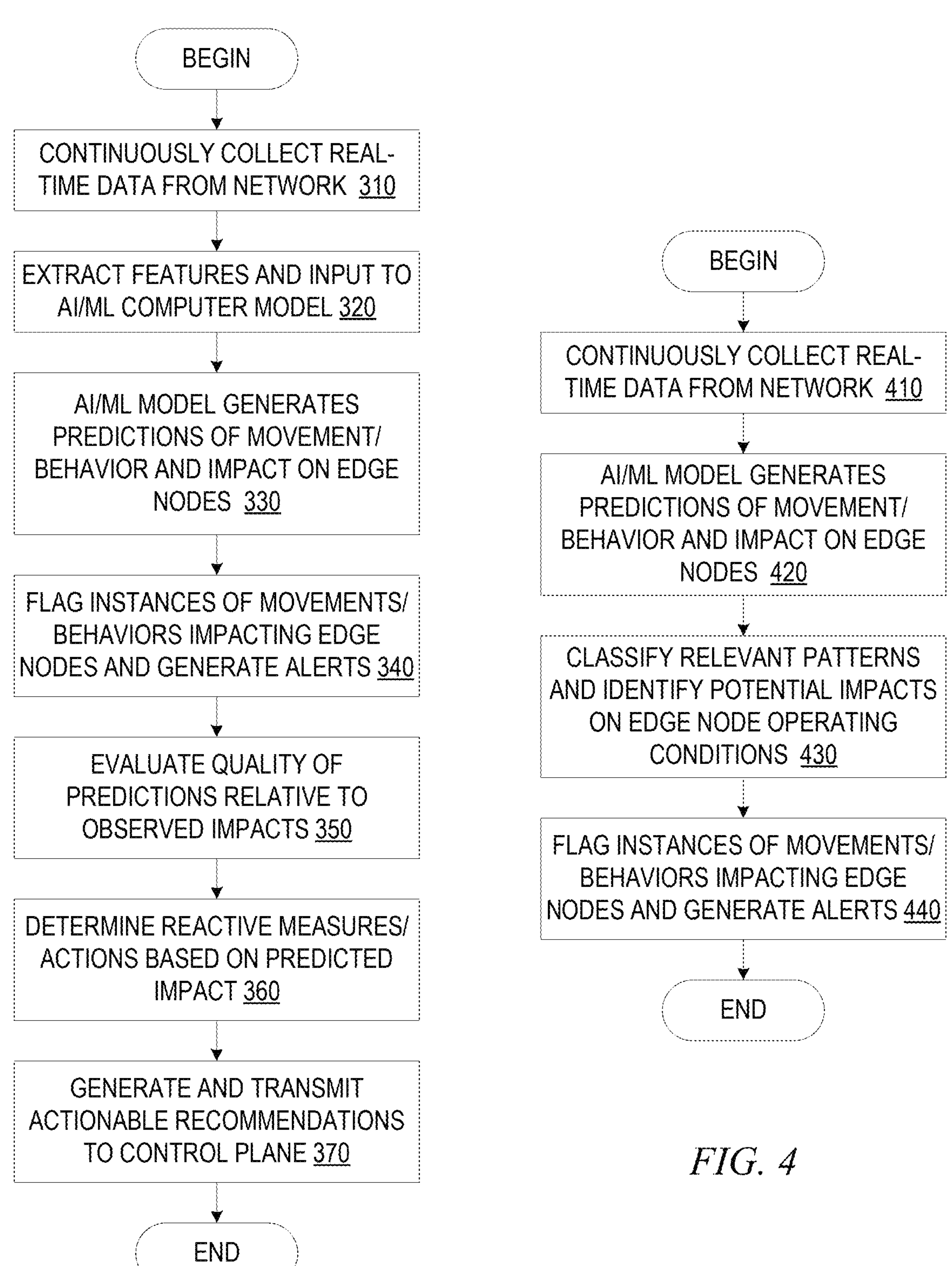
FIG. 3 is a flowchart outlining an example operation of a user intent based proactive edge adaptation engine in accordance with one illustrative embodiment.
FIG. 4 is a flowchart outlining an example operation of a user behavior impact engine in accordance with one illustrative embodiment.

FIG. 3 is a flowchart outlining an example operation of a user intent based proactive edge adaptation engine in accordance with one illustrative embodiment. As shown in FIG. 3, the operation starts by continuously collecting real-time data form various sources within the mobile network, which may include UEs, edge nodes, network telemetry, applications executing on UEs and edge nodes, and the like (step 310). The real-time data collection may include location information for the UEs, application usage for the UEs, network metrics (e.g., latency, throughput, dropped packets, etc.). The data collection may further include retrieval of historical data on user behaviors, network performance, and previous prediction outcomes for training models and detecting patterns.

Features are extracted from the collected real-time data and input to an AI/ML computer model (step 320) which predicts UE movements and user behaviors based on these features and classify these predictions with regard to impacts on edge node operation conditions (step 330). The feature extraction may be part of a data pre-processing operation that may include data cleaning, data normalization, and then the feature extraction. The data cleaning may involve removing noise and irrelevant data points to ensure data quality. The data normalization may involve standardizing the data to ensure consistency across different data sources. The feature extraction involves identifying and extracting key features, such as average data usage, mobility patterns, and application-specific demands.

The predicting of the UE movements and UE or user behaviors based on the extracted features may involve performing user segmentation and pattern recognition. User segmentation may comprise grouping UEs based on SLAs, service usage patterns (e.g., video streaming, browsing, etc.), and priority levels (e.g., emergency services, high-priority enterprise clients, etc.). The pattern recognition involves applying machine learning algorithms to identify usage patterns, trends, and anomalies in user behavior. The prediction modeling may comprise choosing appropriate AI/ML models (e.g., time series forecasting, neural networks, etc.) tailored to predict user behavior impacts, training the models using historical data on user behavior and network performance, and validating the models using a separate dataset to ensure prediction accuracy and reliability. Once trained and validated, these prediction models may be used to perform impact forecasting by simulating predicted user behaviors and their potential impact on edge nodes, forecasting resource demands such as CPU, memory, and bandwidth usage on edge nodes based on predicted user behaviors, and predicting changes in performance metrics such as latency, packet loss, and network throughput due to forecasted user behaviors.

A rules-based engine is executed on the predictions to flag instances where predicted UE movements and/or user behaviors may potentially impact edge nodes and corresponding alerts are generated (step 340). The quality of the predictions may be evaluated based on a comparison of the prediction to an actual observed impact if reactive measures are not implemented (step 350). For example, the quality of the predictions may be determined by continuously comparing predicted impacts with real-time observations to detect deviations and flagging significant deviations where actual data significantly diverges from predicted outcomes. The severity of the detected deviations may then be assessed by comparing QoS metrics (e.g., latency, throughput, error rates, etc.) against predefined SLAs and identifying UEs affected by prediction inaccuracies, focusing on high-priority UEs whose SLAs are critical.

Reactive measures and/or actions are then determined based on the predicted impact (step 360) and actionable recommendations are sent to a control plane of the mobile network for implementation of the actions on the edge nodes of the mobile network (step 370). These reactive measures and/or actions may be determined by using prediction models to identify proactive measures to optimize resource allocation and performance before issues arise and then deriving actionable recommendations based on these predictions, such as specific resource reallocation to critical applications, fine-tuning edge node configurations to better support high-priority UEs, implementing targeted redundancy measures for specific areas or services, optimizing edge configurations (e.g., load balancing), deploying redundancy measures (e.g., activating backup nodes), and the like.

For UEs with severely impaired SLAs, due to false or inaccurate predictions, that were not resolved after remediation actions are applied, detailed user intents data may be collected, i.e., additional information to the information collected above, such as battery status, planned routes (e.g., from navigation applications), etc. This information is not generally collected from UEs in existing networks. A rules-based engine may be used to derive the actionable recommendations based on the collected user intents data, such as again specific resource reallocation, fine-tuning edge node configurations, and implementing targeted redundancy measures.

It should be noted that while FIG. 3 is shown as terminating after step 370, the operation may involve a continuous improvement such as via feedback loop and model update. That is, the outcomes of the reactive measures may be used to refine the prediction models, identifying which adjustments were most effective. The AI/ML computer models, and even parameters of rules in the rules-based engines, may be updated continuously with new data and feedback information to improve prediction accuracy and robustness over time.

FIG. 4 is a flowchart outlining an example operation of a user behavior impact engine in accordance with one illustrative embodiment. As shown in FIG. 4, the operation starts with real-time data collection (step 410) in which mechanisms continuously collect real-time data from various sources within the network. Thereafter, prediction and classification (step 420) are performed by using an adjusted large AI/ML computer model to predict UE movements and user behaviors based on features extracted from the collected real-time data. The predicted UE movements and user behaviors are input to a rules-based engine/system to classify relevant patterns and identify potential impacts on edge node operating conditions (step 430). The rules-based engine/system may flag instances where predicted UE movements and/or user behaviors may potentially impact edge nodes and corresponding alerts may be generated and sent to other elements of the system for use in determining the impact of such movements and behaviors (step 440). The operation then terminates.

Figures 5, 6:
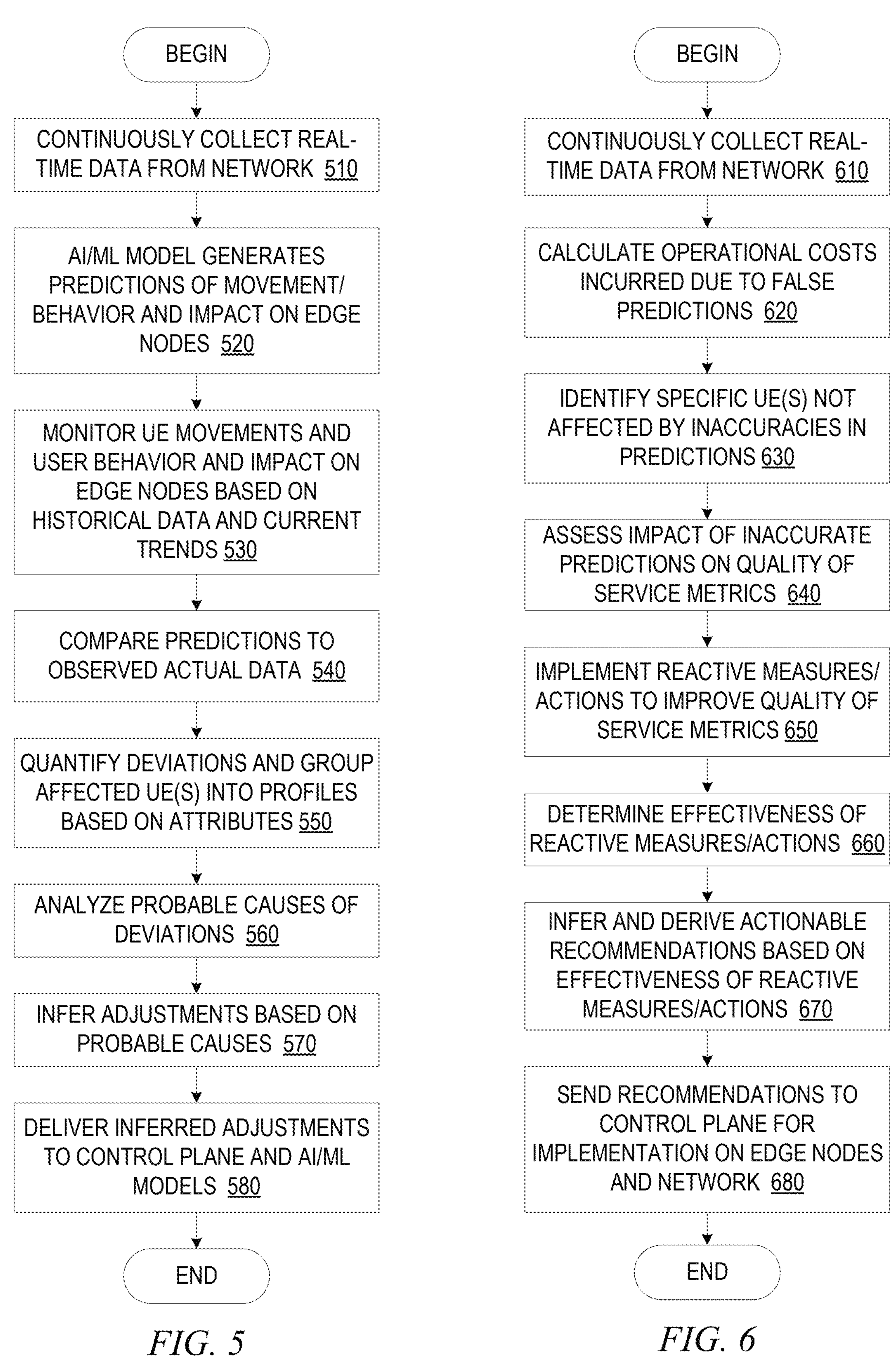
FIG. 5 is a flowchart outlining an example operation of a prediction quality engine in accordance with one illustrative embodiment.
FIG. 6 is a flowchart outlining an example operation of a reactive measure engine in accordance with one illustrative embodiment.

FIG. 5 is a flowchart outlining an example operation of a prediction quality engine in accordance with one illustrative embodiment. As shown in FIG. 5, the operation starts with the collection of data from edge nodes, such as network traffic, device information, session duration, and other relevant metrics, as well as recording user behavior data including services in use, devices utilized, session duration, and the like (step 510). Based on the collected data, a large AI/ML computer model operates on features of the collected data to generate predictions about future user behaviors and UE movements and their impact on edge nodes based on historical data and current trends (step 520). The actual user behavior and UE movements are monitored continuously and their impact on edge nodes is determined in real-time (step 530). The predictions generated by the AI/ML model are compared to this observed/monitored behavior and movement information and their actual impacts to determine the deviations between the predictions and the observed conditions (step 540). These deviations are quantified for each UE and are used to group affected UEs into profiles based on attributes such as services in use, devices utilized, and session duration (step 550).

Based on the groupings of the UEs, a rules-based system analyzes the probable causes of the prediction deviations which may include looking at a variety of different factors including, but not limited to, network congestion, device capabilities, application demands, and the like (step 560). Based on this analysis, the rules-based engine infers adjustments to both the AI/ML computer models (prediction models) and edge node configurations (step 570). For example, if network congestion is identified as primary cause of deviation, the prediction model may be adjusted to account for such congestion to optimize edge node configurations to better handle network congestion. The inferred adjustments are delivered in real-time to the AI/ML computer models in order to update the AI/ML computer models through a feedback mechanism, and to the control plane of the network to dynamically configure edge node parameters, so as to improve prediction accuracy and optimize edge node performance (step 580). The operation then terminates.

FIG. 6 is a flowchart outlining an example operation of a reactive measure engine in accordance with one illustrative embodiment. As shown in FIG. 6, the operation starts with the collection of operational data regarding edge nodes, including the predictions and actual outcomes mentioned above, QoS metrics, and associated costs (step 610). The operational costs incurred due to false predictions is calculated considering factors such as resource consumption, network bandwidth, service degradation, and the like, (step 620). A rule-based engine/system is applied to the collected data and operational costs evaluation to identify specific UEs not affected by inaccuracies in the predictions, e.g., by evaluating their QoS metrics against the impact of incorrect predictions (step 630). The impact of inaccurate predictions on the QoS metrics is assessed by comparing them against predefined SLAs to determine the severity of disruptions (step 640). Reactive measures/actions are implemented to improve the QoS, such as adjusting resource allocation, enhancing edge configurations, deploying redundancy measures, or the like (step 650). The effectiveness of these reactive measures/actions is determined by monitoring the relevant metrics post-implementation (step 660) and a rules-based engine/system is applied to infer and derive actionable recommendations for optimizing resource allocation, enhance edge node configurations, and mitigate disruptions based on the effectiveness determinations and observed prediction quality (step 670). These recommendations are sent to the control plane of the network for implementation at the edge nodes of the network (step 680). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for dynamically implementing reactive actions in edge nodes of a data communication network in response to user equipment (UE) behaviors, the method comprising:

collecting data of UE events in the data communication network to infer UE movements and UE behavior within the data communication network;

executing a machine learning computer model on the collected data of the UE events to predict:

the UE movements, the UE behavior, and impacts of the predicted UE movements and the predicted UE behavior on edge node conditions within the data communication network, wherein the impacts of the predicted UE movements and the predicted UE behavior are predicted based on quality of service (QoS) metrics;

evaluating an accuracy of the predicted impacts of the predicted UE movements and the predicted UE behavior, wherein the evaluating of the accuracy of the predicted impacts of the predicted UE movements and the predicted UE behavior comprises:

grouping a plurality of UEs into UE profiles based on attributes of the plurality of UEs, wherein UEs of the plurality of UEs having similar attributes are grouped into a UE profile of the UE profiles, and the attributes comprise at least one of first attributes specifying services in use by the plurality of UEs, second attributes specifying devices utilized by the plurality of UEs, or third attributes specifying session durations of the plurality of UEs; and predicting an impact of inaccurate predictions on the UE profiles;

executing, based on the accuracy, one or more computer executable rules of a rules based engine, to determine one or more reactive actions, wherein the one or more reactive actions are for reducing the predicted impact of the inaccurate predictions, and the reducing of the predicted impact of the inaccurate predictions is based on the QoS metrics; and sending a recommendation of the one or more reactive actions to a control plane of the data communication network for implementation of at least one of the one or more reactive actions on one or more edge nodes of the edge nodes of the data communication network.

2. The method of claim 1, wherein the evaluating of the accuracy of the predicted impacts of the predicted UE movements and the predicted UE behavior further comprises identifying incorrect predicted impacts based on actual impacts experienced by the data communication network and one or more UEs affected by the incorrect predicted impacts.

3. The method of claim 2, wherein the evaluating of the accuracy of the predicted impacts further comprises identifying a severity of the predicted impacts based on data communication network conditions and priority levels of the one or more UEs affected by the incorrect predicted impacts.

4. The method of claim 1, wherein the collected data comprises updates to edge node configurations comprising hardware, software, and network configurations, updates to edge node performance metrics, and UE reports specifying device data of devices corresponding to the plurality of UEs.

5. The method of claim 4, wherein the executing of the machine learning computer model on the collected data of the UE events comprises:

extracting features from the updates to edge node configurations, the updates to edge node performance metrics, and the UE reports to generate input features for input to the machine learning computer model; and processing the input features to identify patterns of input features corresponding to the predicted UE movements, the predicted UE behaviors, and the predicted impacts of the predicted UE movements and the predicted UE behavior on the edge node conditions.

6. The method of claim 1, further comprising updating a training of the machine learning computer model based on results of the evaluating of the accuracy of the predicted impacts of the predicted UE movements and the predicted UE behavior and the determined one or more reactive actions.

7. The method of claim 1, wherein the one or more reactive actions comprise at least one of resource reallocation between nodes of the data communication network, fine-tuning edge node configurations of the edge nodes of the data communication network, or implementing a targeted redundancy for the edge nodes in the data communication network.

8. The method of claim 1, further comprising:

selecting, by the control plane, one or more management actions to be executed on the one or more edge nodes of the data communication network based on the recommendation of the one or more reactive actions and one or more established policies for management actions; and executing the one or more management actions on the one or more edge nodes of the data communication network to modify a configuration of the one or more edge nodes.

9. The method of claim 1, wherein the plurality of UEs comprises one or more of a smartphone, laptop computer, vehicle mounted computing device, or mobile computing device, and wherein the data communication network is a wireless mobile network.

10. A computer program product comprising a computer readable storage medium having a computer readable program stored therein, wherein the computer readable program, when executed in a data processing system, causes the data processing system to dynamically implement reactive actions in edge nodes of a data communication network in response to user equipment (UE) behaviors at least by:

collecting data of UE events in the data communication network to infer UE movements and UE behavior within the data communication network;

executing a machine learning computer model on the collected data of the UE events to predict:

the UE movements, the UE behavior, and impacts of the predicted UE movements and the predicted UE behavior on edge node conditions within the data communication network, wherein the impacts of the predicted UE movements and the predicted UE behavior are predicted based on quality of service (QoS) metrics;

evaluating an accuracy of the predicted impacts of the predicted UE movements and the predicted UE behavior, wherein the evaluating of the accuracy of the predicted impacts of the predicted UE movements and the predicted UE behavior comprises:

grouping a plurality of UEs into UE profiles based on attributes of the plurality of UEs, wherein UEs of the plurality of UEs having similar attributes are grouped into a UE profile of the UE profiles, and the attributes comprise at least one of first attributes specifying services in use by the plurality of UEs, second attributes specifying devices utilized by the plurality of UEs, or third attributes specifying session durations of the plurality of UEs; and predicting an impact of inaccurate predictions on the UE profiles;

executing, based on the accuracy, one or more computer executable rules of a rules based engine, to determine one or more reactive actions, wherein the one or more reactive actions are for reducing the predicted impact of the inaccurate predictions, and the reducing of the predicted impact of the inaccurate predictions is based on the QoS metrics; and sending a recommendation of the one or more reactive actions to a control plane of the data communication network for implementation of at least one of the one or more reactive actions on one or more edge nodes of the edge nodes of the data communication network.

11. The computer program product of claim 10, wherein the evaluating of the accuracy of the predicted impacts of the predicted UE movements and the predicted UE behavior further comprises identifying incorrect predicted impacts based on actual impacts experienced by the data communication network and one or more UEs affected by the incorrect predicted impacts.

12. The computer program product of claim 11, wherein the evaluating of the accuracy of the predicted impacts further comprises identifying a severity of the predicted impacts based on data communication network conditions and priority levels of the one or more UEs affected by the incorrect predicted impacts.

13. The computer program product of claim 10, wherein the collected data comprises updates to edge node configurations comprising hardware, software, and network configurations, updates to edge node performance metrics, and UE reports specifying device data of devices corresponding to the plurality of UEs.

14. The computer program product of claim 13, wherein the executing of the machine learning computer model on the collected data of the UE events comprises:

extracting features from the updates to edge node configurations, the updates to edge node performance metrics, and the UE reports to generate input features for input to the machine learning computer model; and processing the input features to identify patterns of input features corresponding to the predicted UE movements, the predicted UE behaviors, and the predicted impacts of the predicted UE movements and the predicted UE behavior on the edge node conditions.

15. The computer program product of claim 10, wherein the computer readable program further causes the data processing system to update a training of the machine learning computer model based on results of the evaluating of the accuracy of the predicted impacts of the predicted UE movements and the predicted UE behavior, and the determined one or more reactive actions.

16. The computer program product of claim 10, wherein the one or more reactive actions comprise at least one of resource reallocation between nodes of the data communication network, fine-tuning edge node configurations of the edge nodes of the data communication network, or implementing a targeted redundancy for the edge nodes in the data communication network.

17. The computer program product of claim 10, wherein the computer readable program further causes the data processing system to:

select, by the control plane, one or more management actions to be executed on the one or more edge nodes of the data communication network based on the recommendation of the one or more reactive actions and one or more established policies for management actions; and execute the one or more management actions on the one or more edge nodes of the data communication network to modify a configuration of the one or more-edge nodes.

18. An apparatus, comprising:

at least one processor; and at least one memory coupled to the at least one processor, wherein the at least one memory comprises instructions which, when executed by the at least one processor, cause the at least one processor to dynamically implement reactive actions in edge nodes of a data communication network in response to user equipment (UE) behaviors, at least by:

collecting data of UE events in the data communication network to infer UE movements and UE behavior within the data communication network;

executing a machine learning computer model on the collected data of the UE events to predict:

the UE movements, the UE behavior, and impacts of the predicted UE movements and the predicted UE behavior on edge node conditions within the data communication network, wherein the impacts of the predicted UE movements and the predicted UE behavior are predicted based on quality of service (QoS) metrics;

evaluating an accuracy of the predicted impacts of the predicted UE movements and the predicted UE behavior, wherein the evaluating of the accuracy of the predicted impacts of the predicted UE movements and the predicted UE behavior comprises:

grouping a plurality of UEs into UE profiles based on attributes of the plurality of UEs, wherein UEs of the plurality of UEs having similar attributes are grouped into a UE profile of the UE profiles, and the attributes comprise at least one of first attributes specifying services in use by the plurality of UEs, second attributes specifying devices utilized by the plurality of UEs, or third attributes specifying session durations of the plurality of UEs; and predicting an impact of inaccurate predictions on the UE profiles;

executing, based on the accuracy, one or more computer executable rules of a rules based engine, to determine one or more reactive actions, wherein the one or more reactive actions are for reducing the predicted impact of the inaccurate predictions, and the reducing of the predicted impact of the inaccurate predictions is based on the QoS metrics; and sending a recommendation of the one or more reactive actions to a control plane of the data communication network for implementation of at least one of the one or more reactive actions on one or more edge nodes of the edge nodes of the data communication network.

* * * * *